Dec. 5, 1933.   A. BIZZARRI   1,938,005
HYDRAULIC GREASE DISPENSING DEVICE
Original Filed July 30, 1931
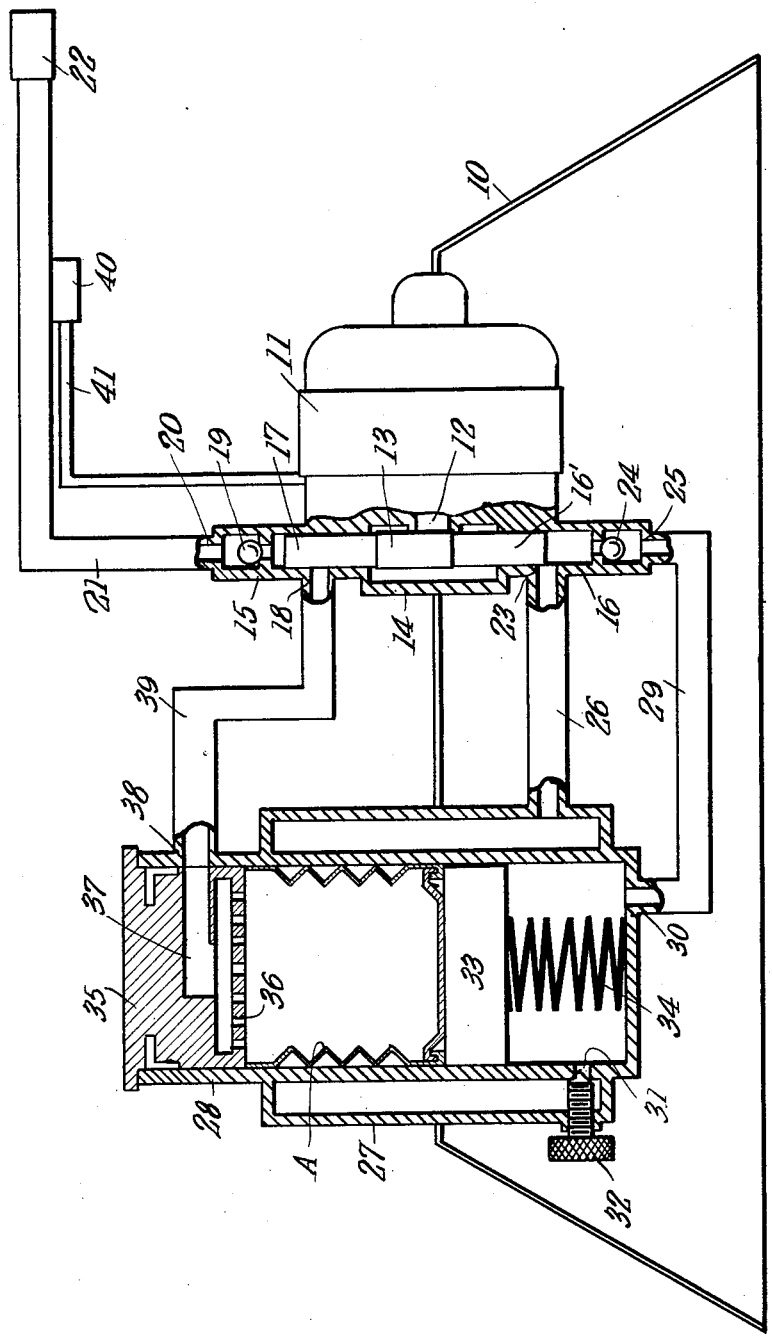
INVENTOR.
Anthony Bizzarri
BY
Edward M. Evarts
his ATTORNEY Patented Dec. 5, 1933

1,938,005

UNITED STATES PATENT OFFICE 1,938,005

HYDRAULIC GREASE-DISPENSING DEVICE

Anthony Bizzarri, New York, N. Y.

Application July 30, 1931, Serial No. 553,991
Renewed April 20, 1933

10 Claims. (Cl. 221—47.1)

My present invention relates to grease dispensing devices, and more particularly to such devices as may be actuated by hydraulic pressure. I have found that when handling heavy greases, such as those used for the lubrication of the differential mechanisms of motor vehicles, it is necessary to employ considerable pressure to expel the heavy grease from its container and inject the same into the differential casing. However, by means of the present invention, I provide hydraulically actuated means whereby the ejection of the heavy grease is readily accomplished. In the accompanying specification I shall describe, and in the annexed drawing show, an illustrative embodiment of the hydraulically actuated grease dispensing devices of the present invention. It is, however, to be clearly understood that I do not wish to be limited to the exact details of the aforesaid illustrative embodiment herein shown and described for purposes of illustration only.

It is the main object of my present invention to provide devices of the general character specified which are simple in construction, easy and economical to fabricate and assemble, and which are admirably adapted to perform their intended functions to eliminate the difficulties experienced with the existing devices for like purposes. Other objects and advantages of the present invention will in part be pointed out in detail hereinafter and will in part be obvious to those skilled in the art to which the present invention relates.

In the accompanying drawing, the single figure shows a partially side elevational, partially longitudinal sectional view of the aforesaid illustrative embodiment of the present invention, a part thereof being diagrammatic.

Referring now more in detail to the aforesaid illustrative embodiment of the hydraulically actuated grease dispensing devices of the present invention, and with particular reference to the drawing illustrating the same, the numeral 10 generally designates a support or stand which preferably consists of an inverted dish-like member. Supported by the stand 10 is an electric motor 11, to the shaft 12 of which is secured an eccentric 13.

Associated with the motor 11 is an eccentric housing 14 with which there may be integrally formed a pair of cylinders 15 and 16. It will be noted that the cylinders 15 and 16 are oppositely disposed so that when the eccentric 13 is rotated, the plungers with which the cylinders 15 and 16 are provided are alternately actuated, the arrangement being such that while one pump is intaking, the other is dispensing, and vice versa.

The cylinder 15 has operable therein a plunger 17, the lower end of which is retained at all times in contact with the eccentric 13 within the housing 14. This cylinder is also provided with an inlet 18 for heavy grease, a check valve 19, and an outlet 20 for the heavy grease referred to. The outlet 20 is connected by a flexible hose 21, or any other grease conveying means on the outer end of which a fitting or adaptor 22 may be secured, this hose being adapted to convey the grease ejected by the pump plunger 17 to wherever the grease is to be used, for example, in lubricating the differential mechanism of a motor vehicle.

The cylinder 16 is provided with a plunger 16', an inlet 23, check valve 24 and outlet 25. The inlet 23 is connected by a pipe 26 with an annular reservoir 27 surrounding a grease reservoir 28. The annular reservoir 27 is adapted to store a light oil or other fluid intended to be utilized to develop hydraulic pressure for the ejection of the heavy grease. The outlet 25 of the cylinder 16 is connected by a pipe 29 with an inlet 30 in the bottom wall of the grease container 28.

The container 28 is in the form of a cylinder and is provided near the lower end thereof with a port 31 communicating with the annular reservoir 27, said port being controlled by a needle valve 32. Operable in the cylinder 28 is a piston 33, said piston being normally retained in the lower portion of the cylinder 28 by means of a tension spring 34. The upper end of the cylinder 28 is sealed by a lid 35 retained in place by any suitable means, not here deemed necessary to be described in detail, said lid carrying in the lower portion thereof a grease strainer 36 and being provided with an outlet passage 37 adapted to communicate, when the lid is in place, with the outlet 38 of the cylinder 28. The outlet 38 is connected by a pipe 39 with the inlet 18 of the grease cylinder 15.

The motor 11 is connected to a source of electric current (not here shown) and is controlled by a switch 40 carried at the end of a cable 41, the opposite end of which is connected with the motor and the source of current in a manner well known to those skilled in the art to which the present invention relates.

This completes the description of the aforesaid illustrative embodiment of the hydraulically actuated grease dispensing devices of the present invention and, while the operation and mode of use thereof are readily apparent from the foregoing description, the same may be briefly summarized as follows:

As already stated, prior to using the devices of the present invention, the piston 33 is retained in the lower portion of the cylinder 28 by the tension spring 34. The cylinder 28 is loaded by removing the lid 35 thereof, which carries with it the strainer 36, and a cartridge A is inserted therein until it comes to rest on the upper surface of the piston 33, the upper end of the cartridge having first been removed so as to expose the heavy grease contained therein. Thereafter, the lid 35 is replaced on the cylinder 28 and at that time the upper edge of the cartridge A will be in contact with the lower surface of the lid. The device is now loaded and ready for use. When desiring to use the grease contained in the cartridge A, for example, for the lubrication of a differential mechanism or any other apparatus requiring heavy grease for lubrication, the adaptor 22 is connected with the fitting with which differential casings and the like are usually provided, and the switch 40 is turned on to start the operation of the electric motor 11. The motor, through the eccentric 13, operates the plungers 17 and 16'. The operation of the plunger 16' causes the oil or other hydraulic fluid in the reservoir 27 to pass from the reservoir through the pipe 26 and into the cylinder 16 from where it is pumped through the outlet 25, pipe 27 and inlet 30 into the lower portion of the cylinder 28, beneath the piston 33. The pressure built up beneath the piston 33 moves said piston upwardly in the cylinder 28 against the action of the spring 34 and crushes the cartridge A, containing the heavy grease, between the piston and the lid 35 of the cylinder. As the cartridge A is crushed, the grease contained therein is forced past the strainer 36, through the passage 37, outlet 38, pipe 39 and inlet 18 into the cylinder 15 from where it is forced by the plunger 17, through the outlet 20, flexible hose 21 and adaptor 22 into the fitting with which the appliance being lubricated is provided. After the particular device is lubricated, the switch 40 is operated to break the electrical circuit through the motor 11 so that no further grease is dispensed.

After the cartridge A has been entirely crushed so that there is no more grease contained therein, the lid 35 may be removed from the cylinder 28 and the empty, crushed cartridge removed and disposed of. Thereafter, the needle valve 32 is operated to open the port 31. This permits the hydraulic fluid in the cylinder 28, beneath the piston 33, to pass out of the cylinder and back into the reservoir 27, this passage being aided by the tendency of the tension spring 34 to return the piston 33 to its normal lower position. Thereafter a new cartridge containing grease may be inserted in the cylinder and the same cycle of operations repeated.

This completes the description of the mode of operation and use of the aforesaid illustrative embodiment of the present invention. It will be noted from all of the foregoing that the devices of the present invention are simple in construction, easy and economical to fabricate and assemble, and admirably adapted to perform their intended functions. Other superiorities and advantages of the devices of the present invention will readily occur to those skilled in the art to which the present invention relates.

What I claim as my invention is:

1. A hydraulically-actuated grease-dispensing device comprising a reservoir receptive of a grease-containing cartridge, a fluid-containing chamber surrounding said reservoir, hydraulic means connected with said chamber and reservoir to crush said cartridge and expel the grease from said reservoir, and means to pump the expelled grease to the place where it is to be used.

2. A hydraulically-actuated grease-dispensing device comprising a reservoir receptive of a grease-containing cartridge, a piston operable in said reservoir and supporting the grease-containing cartridge, a fluid-containing chamber surrounding said reservoir, hydraulic means connected with said chamber and reservoir to actuate said piston to crush said cartridge and expel the grease from said reservoir, and means to pump the expelled grease to the place where it is to be used.

3. A hydraulically-actuated grease-dispensing device comprising a reservoir receptive of a grease-containing cartridge, a piston operable in said reservoir and supporting the grease-containing cartridge, a fluid-containing chamber surrounding said reservoir, a pump connected with said chamber and reservoir to actuate said piston to crush said cartridge and expel the grease from said reservoir, and means to pump the expelled grease to the place where it is to be used.

4. A hydraulically-actuated grease-dispensing device comprising a reservoir receptive of a grease-containing cartridge, a fluid-containing chamber surrounding said reservoir, hydraulic means connected with said chamber and reservoir to crush said cartridge and expel the grease from said reservoir, and a pump to force the expelled grease to the place where it is to be used.

5. A hydraulically-actuated grease-dispensing device comprising a reservoir receptive of a grease-containing cartridge, a piston operable in said reservoir and supporting the grease-containing cartridge, a fluid-containing chamber surrounding said reservoir, hydraulic means connected with said chamber and reservoir to actuate said piston to crush said cartridge and expel the grease from said reservoir, and a pump to force the expelled grease to the place where it is to be used.

6. A hydraulically-actuated grease-dispensing device comprising a reservoir receptive of a grease-containing cartridge, a piston operable in said reservoir and supporting the grease-containing cartridge, a fluid-containing chamber surrounding said reservoir, a pump connected with said chamber and reservoir to actuate said piston to crush said cartridge and expel the grease from said reservoir, and a pump to force the expelled grease to the place where it is to be used.

7. A hydraulically-actuated grease-dispensing device comprising a reservoir receptive of a grease-containing cartridge, a fluid-containing chamber surrounding said reservoir and communicating therewith, a piston operable in said reservoir and supporting the grease-containing cartridge, hydraulic means connected with said chamber and reservoir to crush said cartridge and expel the grease from said reservoir, means to pump the expelled grease to the place where it is to be used, and a manually actuated valve to permit the return of the fluid from said reservoir to said chamber and permit said piston to return to its normal position.

8. A hydraulically-actuated grease-dispensing device comprising a reservoir receptive of a grease-containing cartridge, a fluid-containing chamber surrounding said reservoir and communicating therewith, a piston operable in said reservoir and supporting the grease-containing cartridge, a pump connected with said chamber and reservoir to crush said cartridge and expel the grease from said reservoir, means to pump the expelled grease to the place where it is to be used, and a manually actuated valve to permit the return of the fluid from said reservoir to said chamber and permit said piston to return to its normal position.

9. A hydraulically-actuated grease-dispensing device comprising a reservoir receptive of a grease-containing cartridge, a fluid-containing chamber surrounding said reservoir and communicating therewith, a piston operable in said reservoir and supporting the grease-containing cartridge, hydraulic means connected with said chamber and reservoir to crush said cartridge and expel the grease from said reservoir, a pump to force the expelled grease to the place where it is to be used and a manually actuated valve to permit the return of the fluid from said reservoir to said chamber and permit said piston to return to its normal position.

10. A hydraulically-actuated grease-dispensing device comprising a reservoir receptive of a grease-containing cartridge, a fluid-containing chamber surroundng said reservoir and communicating therewith, a piston operable in said reservoir and supporting the grease-containing cartridge, a pump connected with said chamber and reservoir to crush said cartridge and expel the grease from said reservoir, a pump to force the expelled grease to the place where it is to be used, and a manually actuated valve to permit the return of the fluid from said reservoir to said chamber and permit said piston to return to its normal position.

ANTHONY BIZZARRI.